R. C. HENDERSON.
CORN PLANTER.
APPLICATION FILED MAY 2, 1916.
1,251,021.
Patented Dec. 25, 1917.
6 SHEETS—SHEET 1.
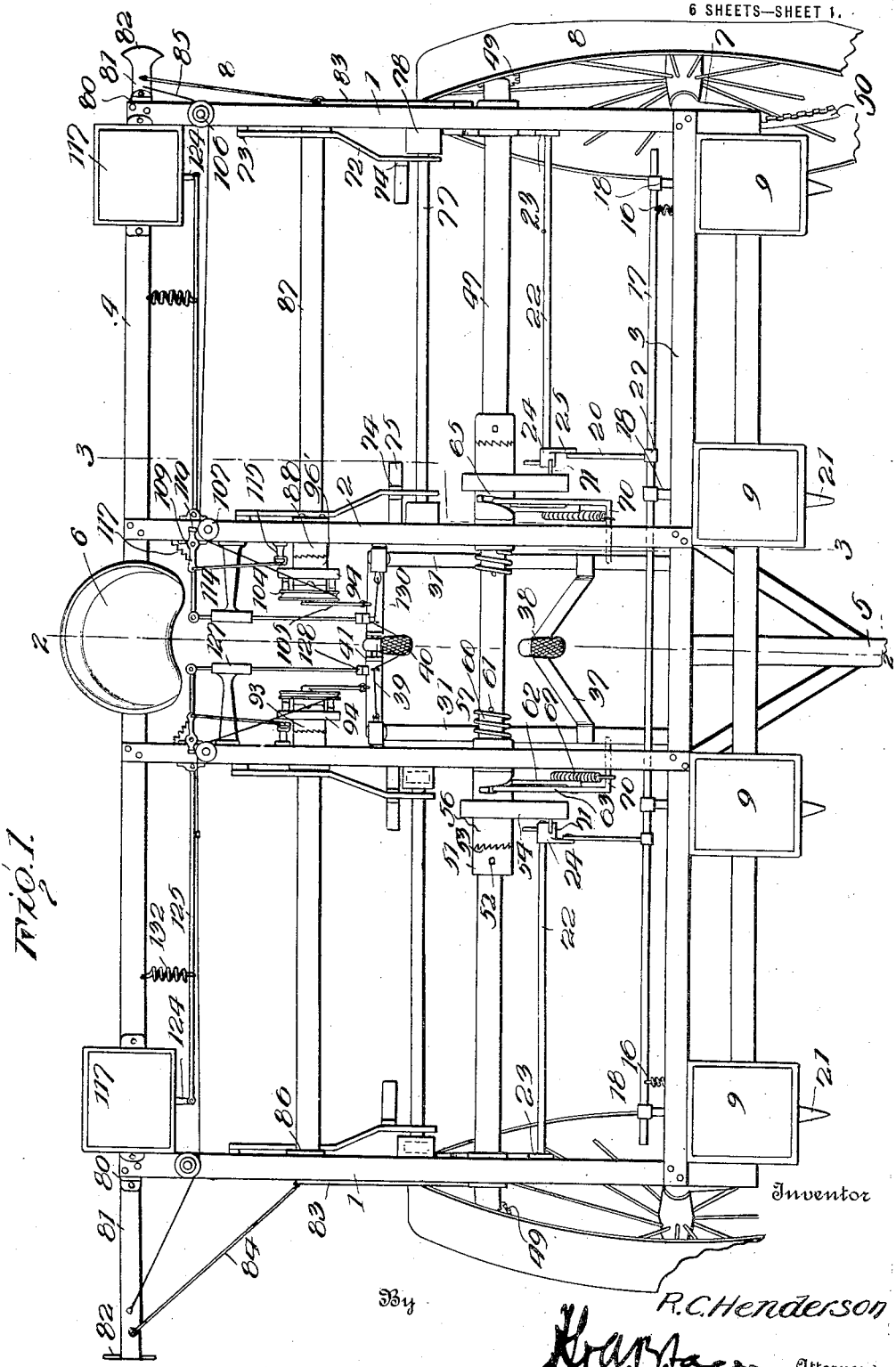
Inventor
R. C. Henderson
By
Attorneys.

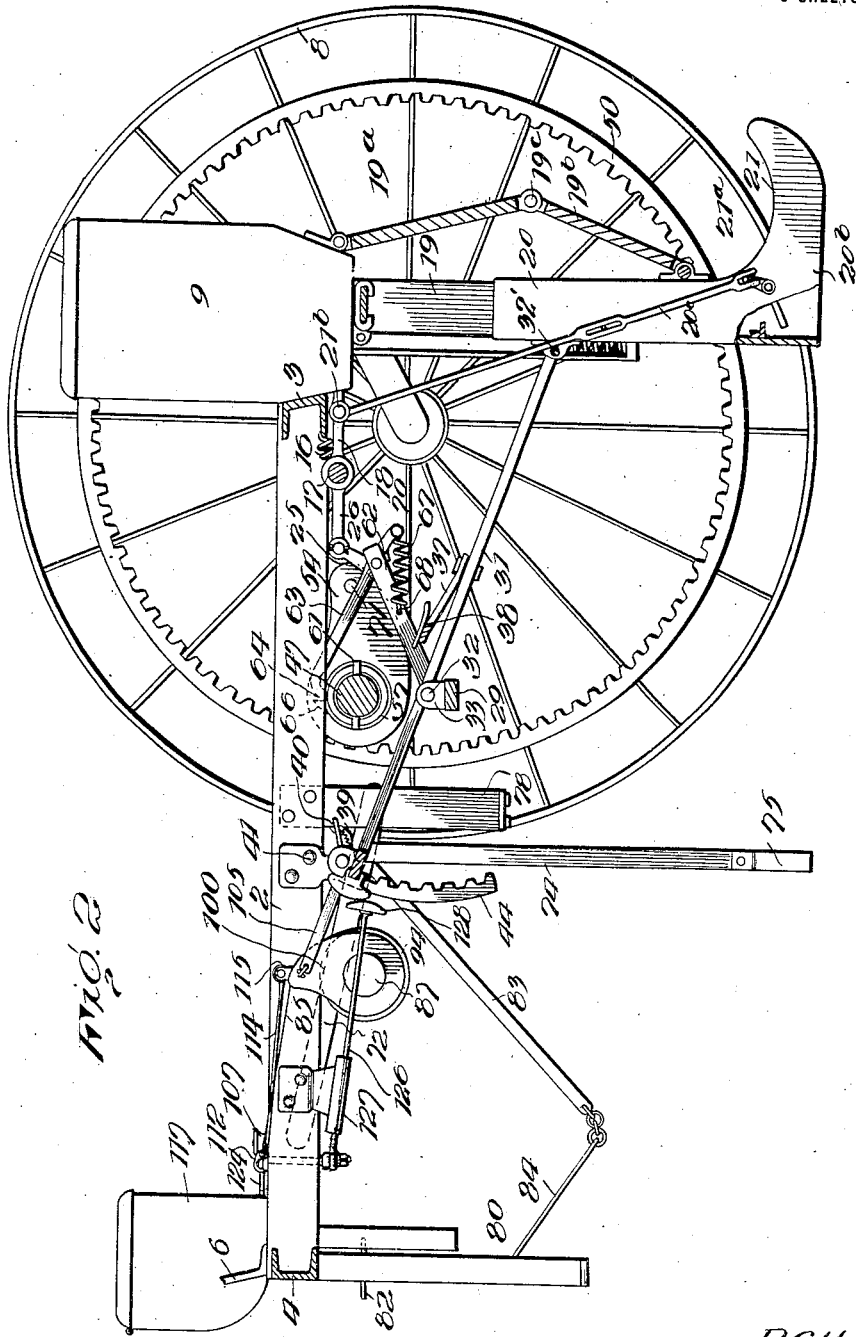

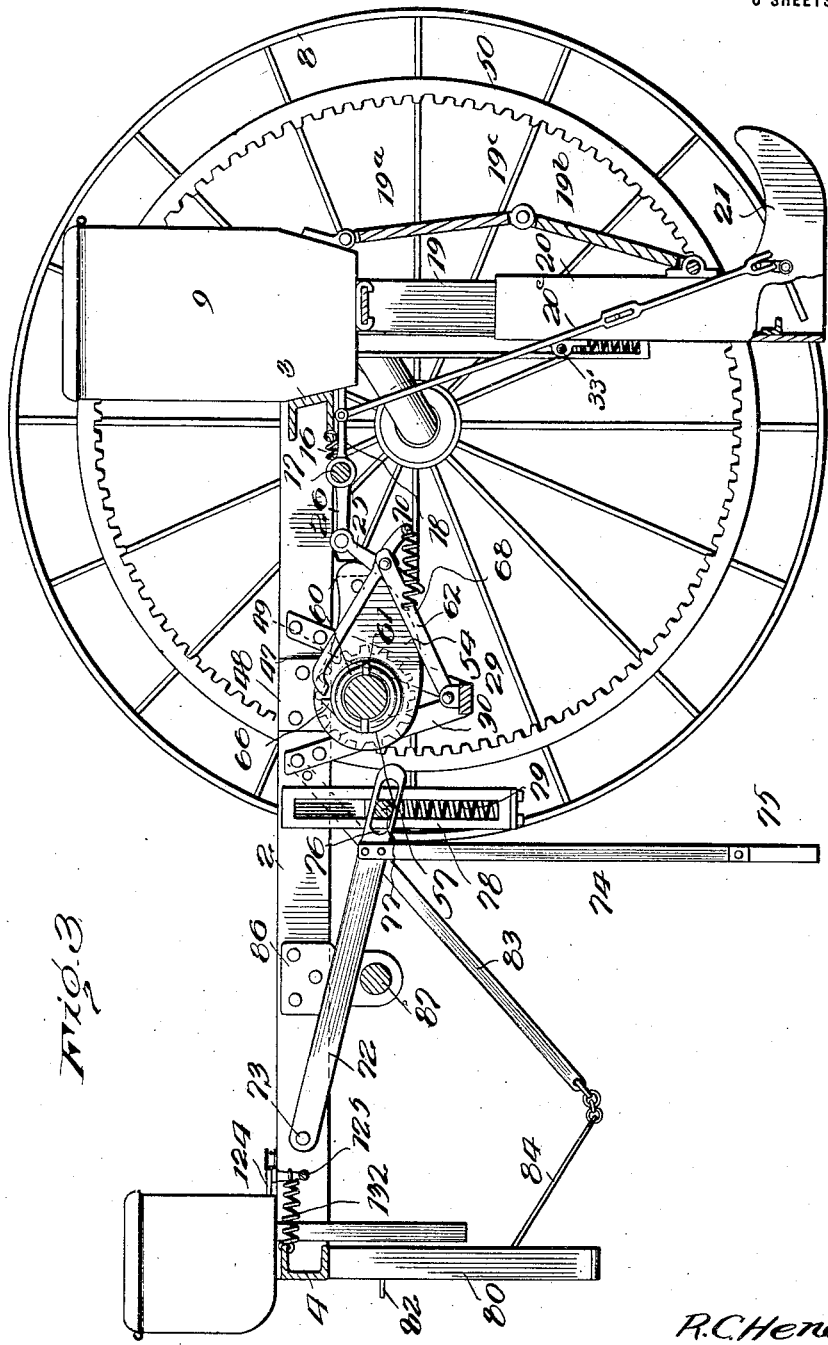

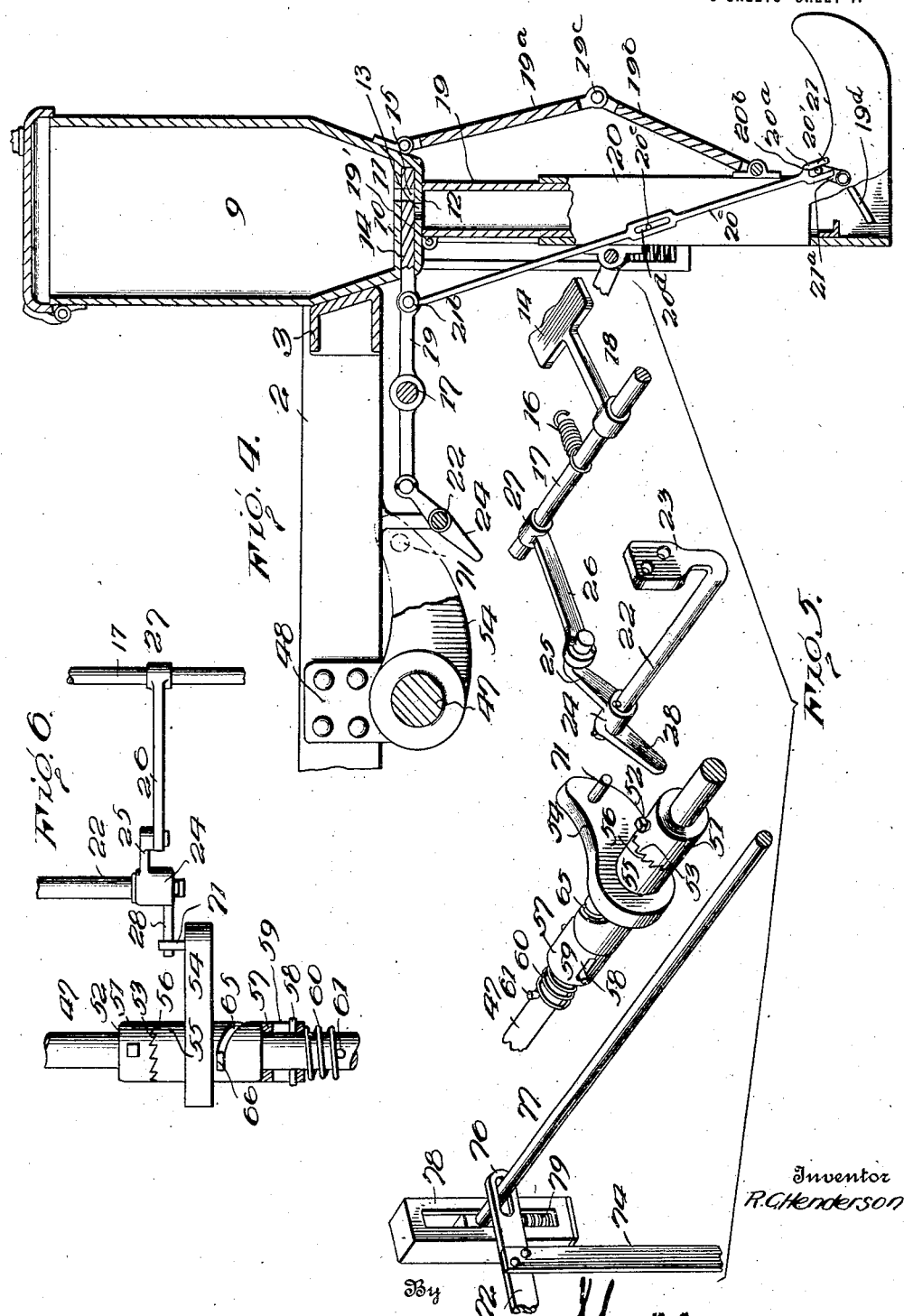

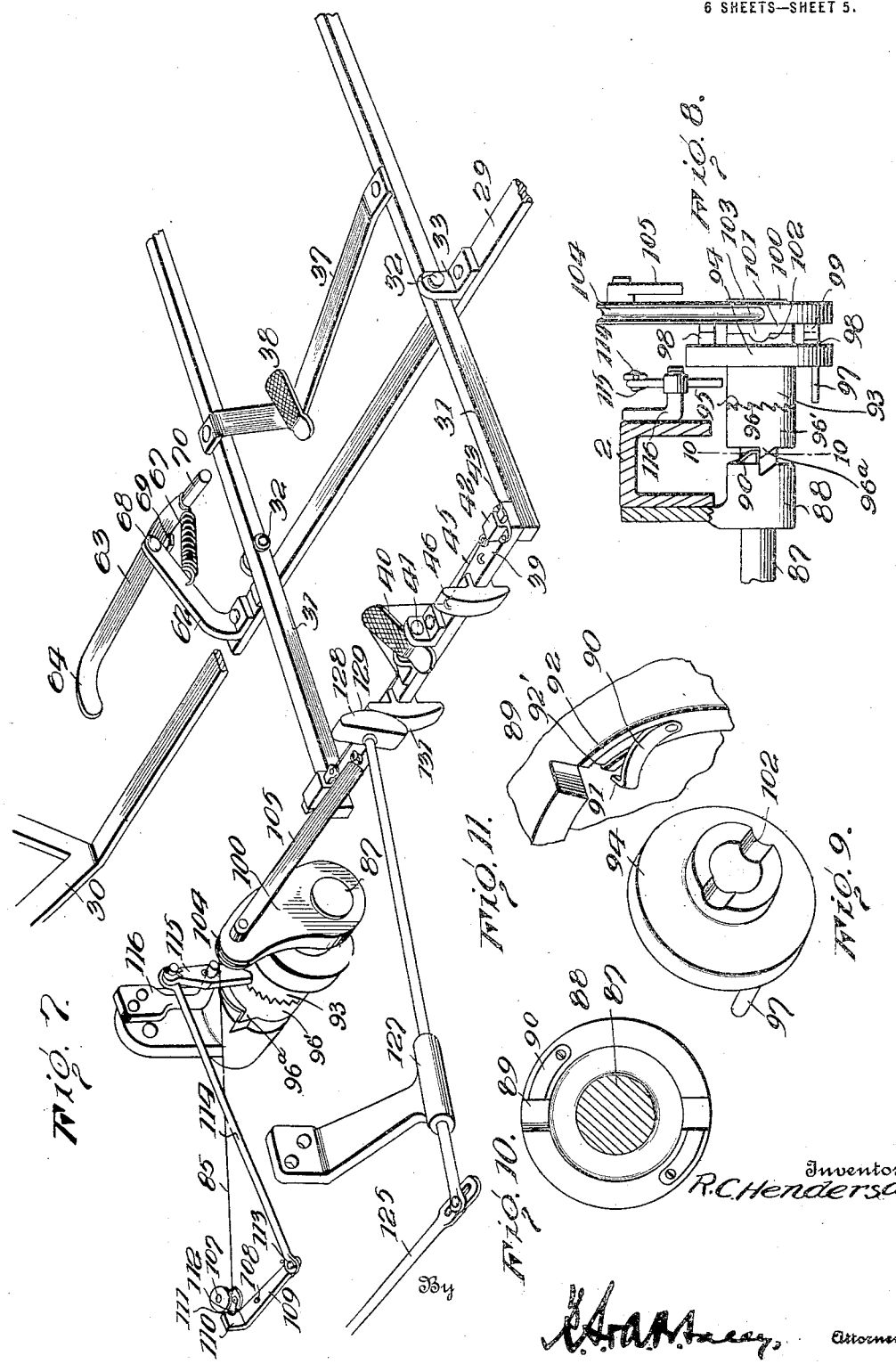

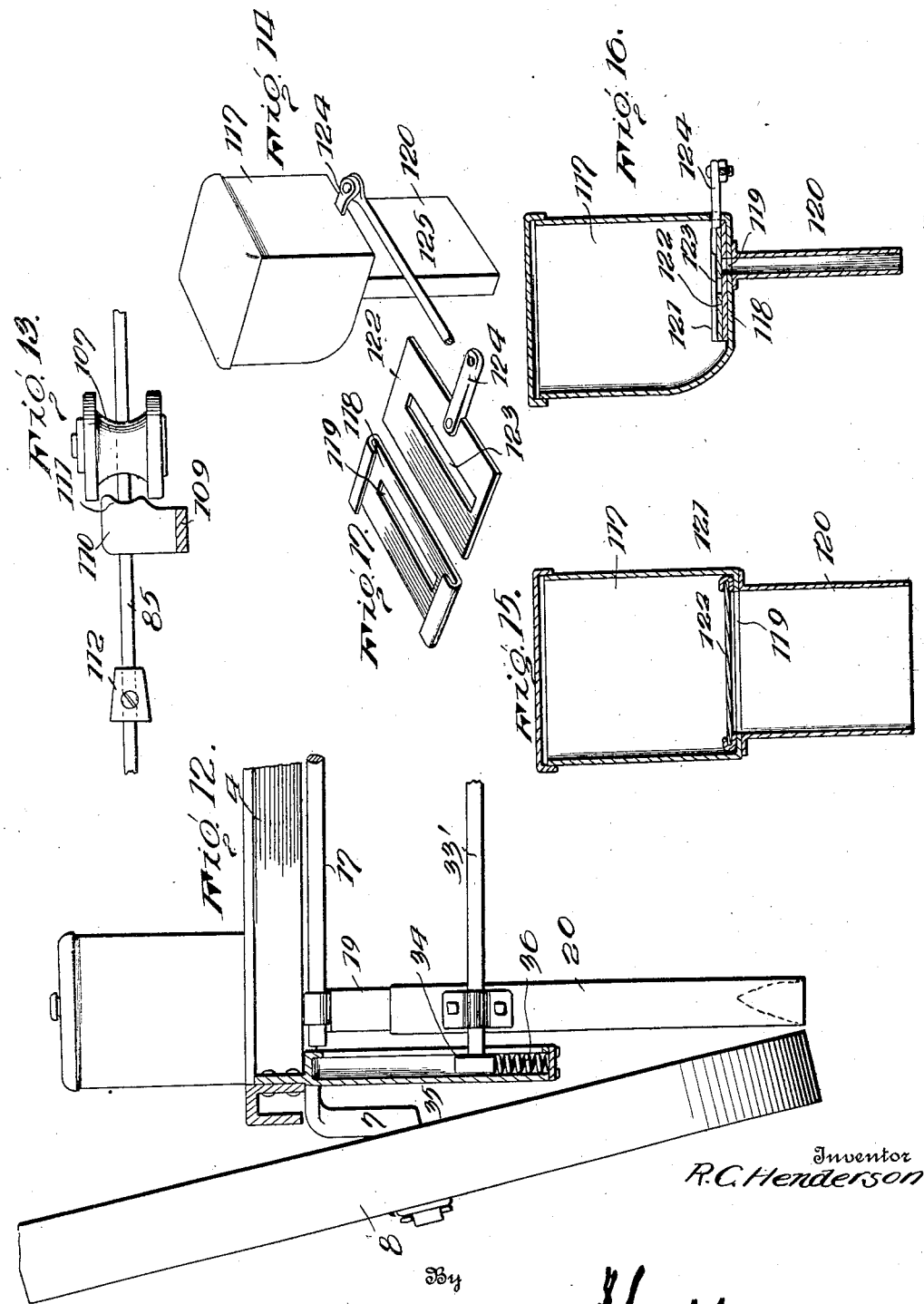

UNITED STATES PATENT OFFICE.

RUFUS C. HENDERSON, OF KANKAKEE, ILLINOIS.

CORN-PLANTER.

1,251,021.  Specification of Letters Patent. Patented Dec. 25, 1917.

Application filed May 2, 1916. Serial No. 94,948.

*To all whom it may concern:*

Be it known that I, RUFUS C. HENDERSON, a citizen of the United States, residing at Kankakee, in the county of Kankakee and State of Illinois, have invented certain new and useful Improvements in Corn-Planters, of which the following is a specification.

This invention relates to agricultural machines and more particularly to a corn planter and it is one aim of the invention to provide a machine of this character embodying seed dropping mechanism, mechanism for marking the dropped hills of corn, mechanism for marking the planted rows, and mechanism for indicating the beginning and end of each row, all of said mechanisms being under the control of the operator of the machine through the manipulation of a single lever.

The invention also aims to provide a lever mechanism in a machine of this class operable to raise the seed boots from the furrows and in conjunction therewith means actuated by the movement of the lever mechanism to automatically throw out of gear the seed planting mechanism so that when the boots are lifted from the furrows, the seed will automatically cease to be dropped.

The invention further contemplates the provision of means actuated through the movement of the lever to lift the seed boots, to automatically deposit a quantity of sand or other material at the end of the planted row or rows. In this connection, the invention also contemplates actuation of the sand depositing mechanism upon return movement of the lever in the act of lowering the seed boots into the furrows so that sand will be deposited at the beginning of the row or rows to be planted.

The invention also aims to provide at each side of the machine a marker arm designed to indicate the position of a new row to be planted and to provide means operable through the movement of the lever above mentioned for alternately bringing these marker arms into position without any attention on the part of the operator of the machine other than the manipulation of the lever to raise and lower the seed boots by rocking the lever in one direction or the other.

In the accompanying drawings,

Figure 1 is a top plan view of the machine embodying the present invention,

Fig. 2 is a vertical front to rear sectional view therethrough, the parts being shown in planting and marking positions, the view being taken substantially on the line 2—2 of Fig. 1, Fig. 3 is a similar view taken substantially on the line 3—3 of Fig. 1, Fig. 4 is a detail vertical front to rear sectional view illustrating the seed dropping mechanism, Fig. 5 is a group perspective view illustrating a portion of the seed dropping mechanism and hill marking mechanism, Fig. 6 is a plan view of a portion of the actuating means for the seed dropping mechanism, Fig. 7 is a perspective view illustrating the lever mechanism and a portion of the mechanism for alternately raising and lowering the row marking arms, Fig. 8 is a vertical longitudinal sectional view through a portion of the structure shown in Fig. 7, Fig. 9 is a perspective view of an element of the structure shown in Fig. 8, Fig. 10 is a vertical sectional view on the line 10—10 of Fig. 8, Fig. 11 is a fragmentary perspective view of the member shown in Fig. 10, Fig. 12 is a transverse sectional view taken in a plane in rear of one of the seed boots, Fig. 13 is a side elevation of one of the detent devices for maintaining the row marking arms in elevated position, Fig. 14 is a perspective view of one of the sand boxes for depositing sand at the ends of the rows, Fig. 15 is a vertical transverse sectional view through the said sand box, Fig. 16 is a vertical front to rear sectional view therethrough, Fig. 17 is a group perspective view of the valve plate for the said box.

The frame of the machine embodying the present invention includes side frame bars 1, intermediate frame bars 2, a forward frame bar 3, and a rear frame bar 4. The frame bar 3 has connected to it the usual tongue 5 and the rear frame bar 4 supports the usual operator's seat 6. Spindles 7 extend downwardly and rearwardly from the forward corners of the frame and support ground wheels 8 which in turn support the machine for travel. The numeral 9 indicates a number of seed hoppers which are equidistantly spaced and supported in any suitable manner upon the forward frame bar 3, there being in the present instance, four of these seed hoppers although it will be readily understood from the drawings and from the descriptiton which is to follow that the number of seed hoppers may, with slight modification of the structure, be increased or decreased in number. Each of the seed hoppers 9 is provided with a false bottom 10 having the usual seed outlet opening 11 and is further provided with a bottom 12 having a seed outlet opening 13. A valve plate 14 is slidably mounted within each hopper 9 between the bottoms 10 and 12 in the manner clearly shown in Fig. 4 of the drawings and is provided with a seed pocket 15. The valve plates 14 are normally held forwardly or in the position shown in Fig. 4 of the drawings by springs 16 which are connected at their forward ends to the respective hoppers and at their rear ends to a rod 17 to which all of the valve plates 14 are connected by integral shanks 18. By reference to Fig. 4, it will be observed that in the normal positions of the valve plates 14, the openings of the seed pockets 15 will be in registration with the seed outlet openings 11 but out of registration with the openings 13 and it will be further understood that in this position, the grains of corn will be received within the pocket 15 so that upon rearward sliding movement of the valve plates, the collected grains will drop through the openings 13 upon the seed pockets coming opposite these openings. Each seed hopper is provided with a seed boot comprising a section 19 which is connected to the bottom 12 of the respective hopper and to which is slidably telescopically fitted, the upper end of the other section of the boot indicated by the numeral 20, this section at its lower end, terminating in the boot proper indicated by the numeral 21. It will now be apparent that the sections 20 of the seed boots may be slid upwardly upon the sections 19 so as to raise the boots 21 out of the furrows and that, on the other hand, the sections 20 may be slid downwardly upon the sections 19 so as to lower the boots into the furrows in position for the depositing of the seed in hills as the valve plates are reciprocated through actuating mechanism to be presently described.

The upper ends of the sections 19 of the seed boots are hingedly connected as at 19' to the under sides of the bottoms 12 of the respective seed hoppers and in order to brace the seed boots and particularly the lower sections thereof in their raising and lowering movements, plates $19^a$ and $19^b$ are hingedly connected to each other at their lower and upper ends respectively as at $19^c$ and are respectively pivoted at their upper and lower ends to the respective seed hoppers and to the lower sections of the respective seed boots. It will be understood by reference to Fig. 4 of the drawings that when the valve plate 14 is slid rearwardly the seed collected in the pocket 15 will drop through the seed discharge openings 13 and in order that the seed may be collected and retained at the lower end of the section 20 of the boot and subsequently discharged into the furrow at the proper time a valve plate $19^d$ is mounted for oscillatory movement within the rear end of the boot 21, the said plate being fixed upon a transverse shaft 20' carrying an arm $20^b$ provided with a laterally projecting pin $20^d$. An actuating rocking arm $20^c$ is provided between its upper and lower ends with a slot $20^d$ in which works a lateral stud $20^e$ projecting from the lower section 20 of the respective seed boot. The lower end of the rocking actuating arm $20^c$ is provided with a fork $21^a$ engaging the pin $20^b$ and the upper end of the said arm is pivotally connected as at $21^b$ to the shank 19 of the respective valve plate 14. When the valve plate 14 is closed, the valve plate $19^d$ is open or in the position shown in full lines in Fig. 4, but when the valve plate 14 is slid rearwardly to deposit the collected seed the valve plate $19^d$ is swung upwardly through the rocking movement of the arm $20^c$ to closed position and will receive the seed discharged through the opening 13. Then as the valve plate 14 is again slid forwardly to closed position the valve plate $19^b$ will be swung down to the full line or open position above referred to. A supporting rod 22 is connected at its ends, by bracket portions 23 with the side members 1 of the frame and mounted for oscillatory movement upon each of these supporting rods is a rocker 24. Each rocker includes an arm 25 which extends upwardly and forwardly and has pivotally connected to it one end of a link 26 the other end of which link is pivotally connected as at 27 with the rod 17. Each rocker further includes an arm 28 which extends downwardly and rearwardly and is designed to be successively engaged by a tappet device constituting an element of mechanism provided for simultaneously actuating the valve plates and which mechanism will presently be fully described.

The lever device for controlling the operation of the several mechanisms embodied in the machine is mounted upon a supporting bar 29 supported at its ends by brackets 30 suspended from the side members 1 of the frame. The said lever device comprises side bars 31 pivotally mounted as at 32 intermediate their ends upon brackets 33 which are in turn mounted upon the supporting bar 29. At their forward ends, the side bars 31 of the lever device are pivotally connected as at 32' to a bar 33' which extends transversely of the front of the machine and is secured in any suitable manner to all of the sections 20 of the seed boots. The ends of the bar 33' are provided with blocks 34 which are slidably mounted each within a channeled guide member 35 depending from the adjacent side member 1 of the frame, the bar 33' being in this manner guided in its vertical movement in raising and lowering the seed boots simultaneously. In order that the downward movement of the bar 33' may be cushioned and in order, therefore, to provide against the seed boots being thrust too violently into the furrows, cushioning springs 36 are employed within the guide members 35 and support the said blocks 34, this structure being clearly shown in Fig. 10 of the drawings. The numeral 37 indicates a cross bar which extends between the side bars 31 of the lever device and which supports a foot piece 38. This cross bar 37 is located forwardly of the pivots 32 for the side members of the lever device and it will therefore be understood that upon downward pressure being exerted upon the footpieces 38, the bar 33' will be moved downward carrying with it all of the seed boot sections 20 thereby lowering the seed boots 21 into the furrows. A cross bar 39 connects the rear ends of the bars 31 of the lever device and supports a foot piece 40 which is mounted for oscillatory movement between brackets 41 upon the said bar. At this point, it will be apparent that when downward pressure is exerted upon the foot piece 40 the rear portion of the lever device will be swung downwardly and its forward end upwardly thereby raising the bar 33' and the seed boot sections to which it is connected. Mounted upon each end of the cross bar 39 in a suitable casing 42, is a spring pressed pawl 43 designed to coöperate with the teeth of segmental racks 44 secured to the intermediate bars 2 of the frame and extending downwardly therefrom. A wire or cable 45 is connected to the inner end of each pawl 43 and lead through a suitable guide 46 upon the cross bar 39 and connected to the forward end of the foot piece 40. Under normal conditions, the pawls 43 will coöperate with the racks so as to hold the lever device in position with the seed boots lowered or raised as the case may be and when it is desired to operate the lever device so as to change the position of the seed boots, the foot piece 40 is first oscillated so as to swing its forward end downwardly thereby pulling upon the connections 45 and retracting the pawls 43 after which downward pressure may be exerted upon the said foot piece or upon the foot piece 38 depending upon whether it is desired to raise or lower the said boots.

The mechanism for actuating the valve plates 14 of the seed hoppers and for actuating the hill marking devices includes a shaft 47 mounted in suitable bearings 48 upon the side members 1 of the frame of the machine and this shaft is provided at each end with a gear 49 meshing with an internal gear 50, mounted within the respective ground wheel of the machine, the shaft being continuously rotated in a forward direction as the machine is drawn across the field. Fixed upon the shaft 47 adjacent each of the intermediate frame bars 2 between the said bars and the side bars 1, is a collar 51 secured in place by means of a set screw 52 and provided at one end with a clutch face 53. The numeral 54 indicates a cam mounted upon a hub 55 which in turn is slidably and loosely mounted upon the shaft 47 so that the shaft may be rotated independently of the said hub. The hub 55, at its ends, adjacent the collar 51 is provided with a clutch face 56 designed to coöperate with the clutch face 53 of the collar 51 whereby the hub of the cam may be connected for rotation with the shaft 47. A collar 57 is slidably mounted upon the shaft 47 and is held for rotation with the shaft by means of a transverse pin 58 which is secured through the shaft and projects at its ends into slots 59 formed in the said collar 57 and extending longitudinally thereof. A spring 60 is fitted to the shaft 47 and bears at one end against a stop shoulder or pin 61 fixed with relation to the shaft and at its other end, against the collar 57 holding the said collar against that end of the hub 55 of the cam 54 opposite the end at which the clutch face 56 is located. Thus, the spring 60 yieldably holds the hub 55 in clutch with the collar 51 and consequently, the cam is normally connected for rotation with the shaft 47. It will be understood, however, that when the hub 55 is shifted upon the shaft 47 away from the collar 51 against the tension of the spring 60, it will be moved out of clutch with the said collar, 51 and will then cease to rotate with the shaft. As before stated, the invention contemplates that the actuating devices for the seed dropping mechanism shall be thrown out of gear or rendered inactive automatically when the seed boots are raised from the furrows through the manual operation of the lever device above described and in order that this may be accomplished, means is provided for shifting the hub 55 out of clutch with the collar 51 when the forward portion of the lever device is elevated or swung upwardly. It will be understood that two of the cams 54 and its associated parts are provided, and secured upon the supporting bar 29 at a point substantially opposite that end of the hub 55 against which the collar 57 bears is an upwardly and forwardly extending bracket arm 62 upon which is pivotally mounted a rock arm 63 provided at its upper end with a finger 64 which is presented toward the said end portion of the hub 55 and is designed to ride in a cam groove 65 formed in the said end portion of the hub. That end of the groove which is the advancing end in the rotary motion of the cam hub 55 is located adjacent the extremity of the said portion of the hub in which the groove is formed whereas, the opposite end of the groove is located relatively close to the adjacent side face of the cam 54 and the said hub is formed at the last mentioned end of the groove with an upstanding abutment shoulder 66. The finger 64, at the upper end of the arm 63 is, in the normal position of the parts, located opposite the first mentioned end of the groove 65 and at this point, it will be understood that upon rocking of the lever arm 63 so as to project its finger 64 into the said end of the groove and upon continuous forward rotary motion of the cam of the hub 55, the hub will be shifted longitudinally of the shaft 47 against the tension of the spring 60 until its clutch face 50 is out of clutch with the face 53 of the collar 51, at which time the abutment shoulder 66 will have been brought into engagement with the finger 64 and the cam will be positively held against rotation with relation to the shaft 47. In order that the finger 64 may be normally held out of engagement in the groove 65, a spring 67 is connected at one end as at 68 to the bracket arm 62 and at its other end to the lower end portion of the lever arm 63 or in other words, to the arm at a point opposite the finger carrying portion of the arm with respect to the pivot for the arm. The spring 67, of course, tends to swing the lower portion of the arm downwardly and rearwardly and the upper portion thereof upwardly and forwardly and this movement of the arm is limited by a lug 69 which is carried thereby and is adapted to strike against the bracket arm 62 in the manner clearly shown in Fig. 7 of the drawings. The lower end of each of the lever arms 63 is provided with a laterally projecting finger 70 which extends above the adjacent side member 31 of the lever device heretofore described and it will be apparent that when the rear end of the lever is swung downwardly and its forward end upwardly, the side members 31 will be brought into engagement with the fingers 70 thereby rocking the lever arms 63 against the tension of the springs 67 and directing the fingers 64 of these arms into engagement in the grooves 65 of the respective cam hubs 55. The cams 54 serve to actuate the hill marking device in a manner which will be presently explained and each of these cams is provided with a laterally projecting pin 71 which pins are designed in the forward rotary motion of the cams, to ride against the arms 28 of the respective rockers 24 for the purpose of intermittently reciprocating the seed valve plates 14 of the seed hoppers.

From the foregoing, it will be understood that when the parts are in position for planting, the forward rotary motion of the shaft 47 will result in rotation in a corresponding direction of the cams 54 with the result that the pins 71 will be successively brought into contact with the arms 28 of the rockers 24 thereby actuating these rockers simultaneously to pull rearwardly upon the rods 17 against the tension of the spring 16 whereby to correspondingly move the valve plates 14 and drop the seeds from the seed pockets 15 through the openings 13 into the bottoms of the boots 21, the parts including the valve plates 14 being returned to normal position through the action of the said springs 16 as the pins 71 pass the arms 28 before turning the machine to begin the planting of new rows, or in the event that rocks or stumps are met with in the field, and it is necessary that the lever device heretofore described be actuated to lift the seed boot sections 20 from the furrows. Therefore, at such time, the rear end of the lever is swung downwardly and its forward end upwardly and simultaneously with this movement of the lever to elevate the seed boot sections 20, the lever arms 63 will be rocked in the manner above pointed out so that their fingers 64 will seat in the grooves 65 in the cam hubs and the hubs will be drawn out of clutch with the collars 51 and the cams will be held against rotation with the shaft 47 so that while the seed boots are out of the furrows, the valve plates 14 of the seed hoppers will not be reciprocated to drop the seed. However, as soon as the machine has been turned to a position to begin the planting of new rows or after the obstruction met with in the field has been passed, the lever is returned to its normal position by swinging down its forward end and the seed boot sections 20 are lowered into the furrows. At the same time, the springs 67 will swing the lever arm 63 so as to move the fingers 64 out of engagement in the cam grooves 65 and the springs 60 will shift the cam hubs 55 into clutch with the collars 51 and the cams will again be caused to rotate with the shaft 47, the seed dropping mechanism being, at such time, again rendered active to drop the seed.

The hill marking mechanism comprises pairs of arms 72, one arm of each pair being pivoted at its rear end to each side member 1 of the frame of the machine and the other arm of each pair being pivotally connected at its rear end to the respective one of the intermediate frame members 2, both being indicated by the numeral 73. Secured to each arm near its forward end, is a standard 74 supporting at its lower end, one of a pair of marker shoes 75, the arms which are mounted upon the side members 1 of the frame having their standards 74 provided each with a single one of the shoes 75 which is inclined downwardly and inwardly and in a sense coöperates with the ground wheel at the respective side of the machine. That is to say, each ground wheel travels close to the furrow through which passes the next adjacent seed boot 21 and the shoes 75 are designed to indent these furrows at the points of location of the hills of corn which have been dropped, the indentation being at that side of the furrow opposite to the side at which the ground wheel passes. The other standards 74 each support a pair of marker shoes which are designed to indent the intermediate furrows, the shoes of each pair being inclined downwardly and laterally in opposite directions. The forward or outer end of each arm 72 is formed with a slot 76 and in connection with each pair of rods 72, there is provided a guiding rod 77 which fits at its ends slidably through the slots 76 and into slotted or channeled guides 78 secured to and depending from the corresponding side and intermediate members of the frame, the ends of this bar resting upon the upper ends of springs 79 arranged within the said guides 78. By reference to the drawings and particularly Figs. 3 and 5 thereof, it will be observed that the rods 77 are located in the path of rotation of the respective cams 54 and consequently, as the shaft 47 is rotated in the forward travel of the machine, these cams will intermittently sweep beneath the rods 77 elevating the said rods and then permitting the same to fall by gravity thus allowing the marker shoes 75 to indent the furrows. The downward movement of the rods 77 is, however, cushioned by the springs 79. It will now be understood that when the lever device previously described is manually actuated so as to lift the seed boots and the cams are rendered inactive and held against rotation with the shaft, the cams will cease to actuate the rods 77 and therefore, the marker mechanism will be rendered inactive while the machine is being turned or is passing over obstructions met with in the field.

In order that the soil may be marked parallel to the planted rows and the machine therefore guided in its travel in the planting of new rows, a marker arm is mounted at each rear corner of the frame of the machine and means is provided for alternately bringing these arms into action. In the drawings, the numeral 80 indicates a rigid standard which extends downwardly from each rear corner of the frame of the machine and pivoted at its inner end to the lower end of each of these standards, is a marker arm indicated by the numeral 81 and provided at its outer end with a marker shoe 82. In order that the marker arms may be braced when in lowered position, a bracket 83 is rigidly secured to each side member 1 of the frame of the machine and extends downwardly and rearwardly and has loosely connected with its lower end, one end of a link rod 84, the other end of which rod is connected to the respective marker arms 81, inwardly of the shoe 82. The points of connection of the rod 84 with the bracket arms 83 and marker arms 81 are so located that the rods 84 will not interfere with the raising or lowering of the arms 81 and yet the arms will be firmly braced against the rearward pull exerted upon them as the shoes 82 travel over the soil. The marker arms are raised or lowered through the instrumentality of cables 85 which are taken in and paid out in a manner which will now be explained. Mounted as at 86 upon each of the side members 1 and its respective intermediate frame member 2 is a shaft 87 and these shafts are located in alinement with each other and each carries at its inner end an actuating mechanism for the cables 85 a single one of which mechanism will now be explained. the said mechanisms being structurally alike. Each of the members 2 has secured upon it a bearing 88 which rotatably receives the respective shaft 87 and one end of each bearing 88 is provided at diametrically opposite points with notches 89 having opposed abrupt and inclined walls and secured at one end to the said end of the bearing at diametrically opposite points and adjacent the inclined walls of the respective notches 89 are springs 90 having their free ends bent as at 91 in the direction of the said end of the bearing. The said end of the bearing is further formed with grooves in which the springs 90 are secured and each of which grooves is of a depth to receive the respective spring, the grooves extending to the inclined walls of the notches 89 and each inclined wall being formed with a recess 92' to receive the bent end 91 of the respective spring 90. Rotatably mounted upon the inner end of each shaft 87 is a hub 93 carrying a disk 94, the hub being provided with a clutch face 95 designed to coöperate with a clutch face 96 upon a collar 96', these clutch faces being so formed that the hub 93 may rotate upon the shaft 87 in a forward direction, the clutch teeth of the said hub riding over the teeth of the collar 96'. The disk 94 is provided upon one face with a laterally projecting pin 97 which pin projects in the general direction of the collar 96' and upon its other face, the said disk is provided with teeth 98 which constitute clutch elements designed for coöperation with similar teeth 99 formed upon the opposing face of a take up member 100 which is provided with a hub 101 rotatably mounted upon the respective shaft 87. The hub 93 of the disk 94 is formed in its ends opposite its clutch end with diametrically oppositely located recesses 102 which are approximately semi-circular and the hub 101 is provided upon its end which opposes the end of the said hub 93 with diametrically oppositely located substantially semi-circular lugs 103 which normally rest in the recesses 102 as clearly shown in Fig. 8 of the drawings. For a purpose to be presently explained the collar 96' is formed at its end which opposes the bearing 88 with teeth 96$^a$ located at diametrically opposite points and provided each with an abrupt face 96$^b$, the teeth being of such shape as to fit within the notches 89. The cables 85 are each connected to the forward side of the respective take up member 100 and the periphery of this member is grooved as indicated by the numeral 104 to accommodate the respective cable. Pivotally connected at its upper end to the member 100 is a link 105 which at its lower end is connected to the cross bar 39 at the adjacent rear corner of the foot lever device heretofore described. Each of the cables 85 is led about a pulley 106 at the rear end of the adjacent side member 1 of the frame of the machine and thence upwardly across the frame and about the pulley 107 upon the adjacent intermediate member 2 of the frame. Each cable is then led forwardly and into the groove 104 of the respective take up member 100 and secured to what is normally the lower end of this member. The member 100 is preferably in the nature of a cam shaped head having its periphery grooved as stated and normally occupies an upright position but is adapted to be swung downwardly or rotated forwardly and downwardly upon the shaft 87 upon downward swinging movement of the rear end of the foot lever device through the pull exerted upon the link 105 as will be presently explained. Pivotally mounted upon the intermediate frame member 2 as at 108 is a detent arm 109 provided with an upstanding head 110 having its side which is presented toward the pulley 107 provided with a notch 111. Fixed upon each of the cables 85 is a conical button 112 having its major end presented in the direction of that end of the cable which is connected to the marker arm and its minor end presented in the direction of forward movement of the cable about the said pulley 107. Pivotally connected to the other end of the detent arm 109 as at 113 is a rod 114 which, at its forward end is pivotally connected to the upper end of a rock arm 115, mounted upon a suitable bracket 116 secured within the frame of the machine. The lower end of the arm 115 projects in the path of travel of the pin 97 upon the respective trip disk 94. By reference to Fig. 1 of the drawings it will be observed that the trip disks are so relatively arranged that their pins 97 will be oppositely located; that is to say, in the operation of the mechanism when the pin 97 of one disk is at the lowermost point in its rotary movement about the shaft 87, the pin of the other disk will be at the uppermost point in its path of rotary motion. A spring 117 is connected to the detent arm 109 at one side of the pivot 112 and to the related frame member 2 and this spring serves to normally yieldably hold the head 110 close to the respective pulley 107. In order that the operation of this portion of the machine may be more readily understood, it will be assumed that both marker arms are in lowered position or in other words, with their shoes resting upon the ground and that consequently, both cables 85 have been permitted to run out so that their buttons 112 will have moved outwardly past the head 110 of the respective detent arms 109. Upon pressing downwardly upon the foot piece 40 of the lever device so as to swing downwardly the rear end of the said lever, a downward pull will be exerted upon the links 105 and the take up members 100 will be swung downwardly and forwardly thereby pulling in upon the cables 85 and swinging both of the marker arms upwardly to inactive position or, in other words, opposite their respective standards. Such movement of the cables 85 will cause the buttons 112 to ride past the heads 110 of the detent arms 109 and pass forwardly beyond the pulleys 107. It will also be apparent by reference to Fig. 8 of the drawings, that upon downward and forward swinging movement of the take up members 100, the hubs 93 of the trip disks being held against rotation by reason of the fact that they are in clutch with the respective collars 96', the abrupt faces 96$^b$ of the teeth 96$^a$ at which time abut against the bent ends 91 of the springs 90 so as to hold the collars 96' against forward rotary motion, the lugs 103 will ride out from the recesses 102 and the said trip disks and collars 96' will be shifted upon the shafts 87 against the tension of the respective springs 90 of the respective collars 88. In such movement of the disks 94, the teeth 98 will, of course, be brought out of engagement with the teeth 99 and therefore, the downward and forward swinging movement of the take up members 100 is not restrained or interfered with. Inasmuch as the foot piece 40 is depressed and the rear end of the foot lever is swung downwardly prior to turning of the machine at the ends of a planted row or rows, both marker arms will be held in raised or inactive position while the machine is being turned. After the machine has been turned and it is desired to again proceed with the planting operation, the forward end of the foot lever is swung downwardly and as the rear end of the lever swings upwardly, the take up members 100 will be swung upwardly and rearwardly and returned to their normal positions. As these members have, in their first described rotative movement passed through an arc of substantially 180°, the lugs 103 will be again seated in the recesses 102 in the hub 93 of the trip disks and the said hub and also the collar 96' will have been moved longitudinally of the shaft 87 so as to bring the teeth 96ª into engagement in the notches 89. Therefore, as the take up members 100 are swung upwardly and rearwardly, they will carry with them the respective hubs 93 and their trip disks 94, the clutch teeth 95 positively engaging the teeth 96 as will be readily understood. As before stated, the pins 97 upon the two trip disks are relatively oppositely located as regards the axis of rotation of the disks and consequently, that one of the pins which is at the uppermost point in its path of rotative movement will ride against the lower end of the respective rocker arm 115 pulling forwardly upon the corresponding rod 114 and thereby rocking the detent lever 109 so as to move its head 110 away from the pulley 107 and in this manner the button 112 upon the respective cable 85 will be permitted to pass the pulley and detent and the cable will be paid out until the marker arm to which it is connected has reached its lowered or active position at which time the take up members 100 will have re-assumed their normal positions. The pin 97 upon the other trip disk will however, travel from its lowermost position to its uppermost position without however coöperating with the related rocker arm 115 and therefore, the other cable 85 will merely be allowed to slacken throughout its length forwardly of its button 112, the said button being prevented from passing the pulley 107 by the head 110 of the respective detent arm 109. Thus, for example, the left hand marker arm will in the operation of the mechanism and as above described, be lowered whereas the right hand arm will be maintained in inactive or raised position. It will be understood however, that upon again swinging down the rear end of the foot lever both cables will be pulled inwardly, the pull upon the left hand one of the cables serving to raise the left hand marker arm to inactive position and the pull upon the right hand cable serving to take up the slack therein forwardly of its button 112. Upon again swinging the rear end of the foot lever in an upward direction and returning the take up members 100 to their normal position, the cables will be paid out but at this time, the pin 97 at the right hand side of the machine will coöperate with the related rocker arm 115 to render the respective detent 109 inactive so that the button upon the right hand cable may pass the corresponding pulley 107 and the right hand marker arm will be permitted to swing downwardly to active position, while the left hand marker arm will remain in raised or inactive position. It will be apparent from the foregoing that the marker arms are automatically alternately rendered active and inactive and without any attention whatsoever on the part of the operator of the machine except that he manipulate the foot lever so as to raise the seed boots at the end of each planted row and at the beginning of each new row.

As before pointed out, the present invention contemplates the provision of means for marking the end of each planted row and the beginning of each new row and this operation is accomplished by depositing a small pile of sand from each rear corner of the machine at the time of beginning the turn and at the time of ending the turn. For this purpose, a sand box is mounted at each rear corner of the frame of the machine and these boxes are indicated by the numeral 117 and each is provided with a bottom 118 having an outlet opening 119 communicating with the upper end of a discharge spout 120. The bottom is provided with spaced guides 121 slidably receiving the side edges of a valve plate 122 having an opening 123 therein normally closed by reason of the fact that it is out of registration with the openings 119 in the bottom of the sand boxes. Each valve plate is provided with a shank or stem 124 which extends through the front wall of the box and to which is pivoted one end of a rock arm 125, these arms being mounted upon the intermediate frame members 2 and having their inner ends pivotally connected with the rear ends of rods 126. The rods 126 are slidably mounted in brackets 127 secured upon the frame members 2 and extend forwardly to a point immediately in rear of the rear end of the foot lever. The forward end of each rod 126 is provided with an abutment 128 having a forwardly presented cam face 129 and secured upon the cross bar 39 of the foot lever are abutments 130 each having a rearwardly presented cam face 131. It will now be apparent that when the rear end of the foot lever is swung downwardly, the cam faces 131 of the abutments 130 upon the said lever will ride over the cam faces 129 of the abutments 128 rearwardly upon the rods 126 and so swing the arms 125 as to slide the valve plates 122 of the sand boxes upwardly until the openings 123 register with the openings 119 whereupon a quantity of sand will be permitted to fall from each box and will pass through the spout 120 onto the ground. A spring 132 is connected to each arm 125 and to the rear member 4 of the frame of the machine and these springs serve to normally hold the arms 125 so rocked upon their pivots that the openings in the valve plates 122 will be closed.

It will be understood that if it becomes desirable to vary the distance between rows, the frame of the machine may have its several cross members formed in sections connected for relative adjustment and the shafts which extend transversely of the frame, may likewise be formed in sections.

Having thus described the invention, what is claimed as new is:

1. In seed planting mechanism, a seed hopper, a seed boot associated therewith and movable into and out of planting position, a valve member for controlling the discharge of seed from the hopper into the seed boot, a rotary shaft, an actuating member loosely mounted upon the said shaft, means connected with the valve member and arranged for actuation by the said actuating member, a clutch element fixed upon the shaft, a clutch element carried by the actuating member, means yieldably holding the actuating member in position with its clutch element in clutch with the element upon the shaft whereby to connect the actuating member for rotation with the shaft, the actuating member being provided with a cam portion, a member movable into position for coöperation with the said cam portion of the actuating member and when in such position arranged upon continued rotation of the shaft to shift the actuating member out of clutch with the said clutch element upon the shaft, and a lever operable to move the seed boot into and out of planting position and arranged when operated to move the seed boot out of planting position to coöperate with the last mentioned member to bring the same into coöperative engagement with the said cam portion of the actuating member.

2. In seed planting mechanism, a seed hopper, a seed boot associated therewith and movable into and out of planting position, a valve member for controlling the discharge of seed from the hopper into the seed boot, a rotary shaft, an actuating member loosely mounted upon the said shaft, means connected with the valve member and arranged for actuation by the said actuating member, a clutch element fixed upon the shaft, a clutch element carried by the actuating member, means yieldably holding the actuating member shifted upon the shaft with the clutch elements in mutual engagement whereby to connect the actuating member for rotation with the shaft, the actuating member having a head portion provided with a helical groove, a pivoted lever arm arranged at one end for engagement in the said groove when the arm is rocked in one direction, means yieldably holding the arm with its said end out of engagement in the groove, and a lever operable to move the seed boot into and out of planting position and arranged when operated to move the seed boot out of planting position to coöperate with the lever arm to rock the same against the tension of the said holding means and to bring its said end into engagement in the groove whereby upon continued rotation of the said shaft, the said actuating member will be shifted thereon to disengage the clutch element upon the actuating member from the clutch element upon the shaft.

3. In seed planting mechanism, a seed hopper, a seed boot associated therewith and movable into and out of planting position, a valve member for controlling the discharge of seed from the hopper into the seed boot, a rotary shaft, an actuating member loosely mounted upon said shaft, means connected with the valve member and arranged for actuation by the said actuating member, a clutch element fixed upon the shaft, a clutch element carried by the actuating member, means yieldably holding the actuating member shifted upon the shaft with the clutch elements in mutual engagement whereby to connect the actuating member for rotation with the shaft, the actuating member having a head portion provided with a helical groove, a pivoted lever arm arranged at one end for engagement in the said groove when the arm is rocked in one direction, means yieldably holding the arm with its said end out of engagement in the groove, a lever operable to move the seed boot into and out of planting position and arranged when operated to move the seed boot out of planting position to coöperate with the lever arm to rock the same against the tension of the said holding means and to bring its said end into engagement in the groove whereby upon continued rotation of the said shaft, the said actuating member will be shifted thereon to disengage the clutch element upon the acuating member from the clutch element upon the shaft, and means carried by the said actuating member and arranged for coöperation with the said lever arm to hold the actuating member against rotation with the shaft after having been so shifted.

4. In seed planting mechanism, a seed hopper, a seed boot associated therewith and movable into and out of planting position, a valve member for controlling the discharge of seed from the hopper into the seed boot, a rotary shaft, an actuating member loosely mounted upon the said shaft, means connected with the valve member and arranged for actuation by the said actuating member, a clutch element fixed upon the shaft, a clutch element carried by the actuating member, means yieldably holding the actuating member shifted upon the shaft with the clutch elements in mutual engagement whereby to connect the actuating member for rotation with the shaft, the actuating member having a head portion provided with a helical groove, a pivoted lever arm arranged at one end for engagement in the said groove when the arm is rocked in one direction, means yieldably holding the arm with its said end out of engagement in the groove, a lever operable to move the seed boot into and out of planting position and arranged when operated to move the seed boot out of planting position to coöperate with the lever arm to rock the same against the tension of the said holding means and to bring its said end into engagement in the groove whereby upon continued rotation of the said shaft, the said actuating member will be shifted thereon to disengage the clutch element upon the actuating member from the clutch element upon the shaft, and the said head portion of the actuating member being provided at one end of the said groove with an abutment shoulder arranged for engagement with the said end of the lever arm after the said member has been so shifted upon the shaft, whereby to hold the member against rotation with the shaft.

5. In seed planting mechanism, a seed hopper, a seed boot associated therewith and movable into and out of planting position, a slidable valve plate operable to control the discharge of seed from the hopper into the seed boot, a rocking arm, means connecting one end of the arm and the said valve plate and arranged upon oscillation of the arm to reciprocate the said plate, a rotary shaft, an actuating member loosely mounted upon the shaft, a clutch element fixed upon the shaft, a clutch element carried by the actuating member, means yieldably holding the actuating element shifted upon the shaft with the clutch elements in mutual engagement whereby to connect the actuating member for rotation with the shaft, a tappet element upon the actuating member arranged to strike the other end of the said rocking arm in the rotary movement of the said member and thereby impart reciprocatory motion to the valve plate, the actuating member having a head portion provided with a cam groove and at one end of the groove with an abutment shoulder, a pivoted lever arm provided at one end with a finger arranged for engagement in the said groove upon rocking of the arm in one direction, means yieldably holding the arm rocked to position with its said finger out of engagement in the said groove, a lever operable to move the seed boot into and out of planting position, an abutment element carried by the lever arm and arranged for engagement by the last mentioned lever when the latter is operated to move the seed boot out of planting position whereby to rock the said lever arm to bring its said finger into engagement in the said cam groove and thereby upon continued rotation of the said shaft, impart shifting movement to the actuating member to bring the clutch member carried thereby out of engagement with the clutch upon the said shaft and whereby upon engagement of the abutment shoulder at the end of the said cam groove with the said finger of the lever arm, the said actuating member will be held against rotation with the said shaft.

6. In seed planting mechanism, a seed hopper, a seed boot associated therewith and movable into and out of planting position, a valve member for controlling the discharge of seed from the hopper into the seed boot, a rotary shaft, an actuating member loosely mounted upon the shaft, means connected with the valve member and arranged for actuation by the said actuating member, coöperating clutch elements upon the actuating member and shaft for normally holding the said members for rotation with the shaft, a lever operable to move the seed boot into and out of planting position, a hill marking member mounted for up and down movement and arranged for actuation by the said actuating member to successively mark the planted hills, and means arranged for actuation by the operation of the lever to move the seed boot out of planting position, to shift the actuating member upon the shaft to bring the clutch members out of coöperative engagement and to hold the said actuating member against rotation with the shaft whereby upon such movement of the lever to move the seed boot out of planting position, the actuating means for the valve member and the said hill marking member will be rendered inactive.

7. In a machine of the class described, a frame, a seed hopper mounted in the frame, a seed boot associated with the seed hopper and movable into and out of planting position, a foot lever mounted in the frame and operatively connected at one end with the said seed boot, a foot piece carried by the lever between its said end and its pivot, a foot piece carried by the lever at the other side of the pivot and mounted for oscillatory movement, a rack mounted in the frame, a pawl carried by the foot lever at its last mentioned end and arranged for engagement with the rack, and means connected with the pawl and arranged through oscillation of the last mentioned foot piece to move the pawl out of engagement with the rack.

In testimony whereof I affix my signature.

RUFUS C. HENDERSON. [L. S.]

Copies of this patent may be obtained for five cents each, by addressing the "Commissioner of Patents, Washington, D. C."